United States Patent
Cheston et al.

(10) Patent No.: US 6,725,178 B2
(45) Date of Patent: Apr. 20, 2004

(54) USE OF HIDDEN PARTITIONS IN A STORAGE DEVICE FOR STORING BIOS EXTENSION FILES

(75) Inventors: Richard W. Cheston, Morrisville, NC (US); Daryl Carvis Cromer, Cary, NC (US); Howard Jeffrey Locker, Cary, NC (US); David B. Rhoades, Apex, NC (US); James Peter Ward, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 114 days.

(21) Appl. No.: 10/050,032

(22) Filed: Jan. 15, 2002

(65) Prior Publication Data

US 2003/0135350 A1 Jul. 17, 2003

(51) Int. Cl.[7] .................... G06F 11/30; G06F 3/00; G06F 13/12
(52) U.S. Cl. .................... 702/186; 710/8; 710/72
(58) Field of Search .................... 702/186, 182; 711/170, 173; 710/8, 13, 62, 72, 74, 305, 306, 313

(56) References Cited

U.S. PATENT DOCUMENTS

| 5,136,713 A | 8/1992 | Bealkowski |
| 5,446,898 A | 8/1995 | Bealkowski |
| 2003/0028800 A1 * | 2/2003 | Dayan et al. ............... 713/200 |

* cited by examiner

Primary Examiner—John Barlow
Assistant Examiner—Meagan S Walling
(74) Attorney, Agent, or Firm—Joseph P. Lally; Martin J. McKinley

(57) ABSTRACT

A system and method for storing adapter card Option ROM BIOS extensions on the system's DASD and, more particularly, on a partition of the DASD that is generally inaccessible to the operating system. The system may partition the system DASD into a user partition and a hidden partition where the hidden partition is preferably inaccessible to the operating system. BIOS extensions files are stored in the hidden partition. The system BIOS, when executed, identifies the peripheral devices on the system and interrogates the hidden partition for BIOS extension files corresponding to each of the identified devices. If the hidden partition contains a BIOS extension file corresponding to an identified peripheral device, the file is verified for authenticity. If the verification completes successfully, the BIOS extension file is copied into shadow RAM and control is passed to it. In one embodiment, each BIOS extension file are downloaded to the system's DASD using a standards-based update process that is independent of the vendor or adapter card type.

30 Claims, 3 Drawing Sheets

USE OF HIDDEN PARTITIONS IN A STORAGE DEVICE FOR STORING BIOS EXTENSION FILES

BACKGROUND

1. Field of the Present Invention

The present invention generally relates to field of data processing systems and more particularly to a data processing system employing a hidden partition in its disk storage to store code such as BIOS extension files.

2. History of Related Art

In the field of microprocessor-based data processing systems, one or more processors typically communicate with a system memory via a proprietary and implementation specific system bus. A bridge typically provides an interface between the system bus and at least one I/O bus (also referred to as a peripheral bus). The I/O bus is typically compliant with an industry standard I/O bus protocol such as the widely implemented Peripheral Components Interface (PCI) bus. The PCI bus enables a wide variety of peripheral devices to communicate with the system's processor(s) and system memory. Devices that may be attached to a PCI bus in a typical data processing system include, as examples, hard disk controllers, graphic adapters, and network interface cards.

Manufacturers of peripheral device adapter cards may wish to include BIOS extensions with their cards to provide expanded functionality to the user. BIOS (Basic I/O System) refers to firmware that is executed immediately following system power-on to enable system control of various I/O devices including the keyboard, display screen, disk drives, serial communications, and so forth. The BIOS code also typically performs an Initial Program Load (IPL) that copies operating system code (or portions thereof) from a system disk or other peripheral device to system memory. As its name implies, a BIOS extension enables an adapter manufacturer to define device specific code that is invoked via the system BIOS typically after the execution of a power on self test (POST) and before the IPL.

PCI (and other bus type) adapters allow for the inclusion of an Option ROM, physically located on the adapter, that contains the adapter's BIOS extension code. BIOS extension code is executable code in a binary format (i.e., native machine code). For purposes of this disclosure, an adapter's BIOS extension code may be referred to as the adapter's BIOS extension file. In some cases, the PCI adapters come standard with the Option ROM and in other cases, an Option ROM socket is provided, but not populated. The Option ROM and its corresponding socket, unfortunately, add to the cost of the adapter card. Moreover, the BIOS extension code stored in an Option ROM may have defects (bugs) requiring an update. Updating the contents of an Option ROM is usually a crude process that typically includes executing an adapter-specific proprietary update program that generally runs under a real mode operating system such as DOS and in many cases must be manually performed via a floppy diskette. In other cases, a customer may want to add the physical ROM on the adapter to obtain extended functionality from the peripheral device. From the system administrator's perspective, this is a labor intensive and costly method of updating a system that has already been deployed into a production user environment.

For all of these reasons, it would be highly desirable to implement a standardized method and system for loading BIOS extensions during system BIOS execution. It would be further desirable if the implemented solution stored the BIOS extensions local to the system, such as in the system's non-volatile mass storage sometimes referred to as a Direct Access Storage Device (DASD) or hard disk. It would be still further desirable if the BIOS extension code were stored in an area of the storage device that is generally inaccessible to the user and/or operating system to decrease the probability of an end user corrupting the BIOS extensions.

SUMMARY OF THE INVENTION

The problems identified above are in large part addressed by a system and method that define a standardized architecture for storing adapter card BIOS extensions on the system's DASD and, more particularly, on a partition of the DASD that is generally inaccessible to the operating system and system user. The system may partition the system DASD into a user partition and a hidden partition. In this embodiment, the hidden partition is preferably inaccessible to the operating system thereby decreasing the probability of code stored therein being corrupted. In one embodiment, peripheral device BIOS extensions are stored in the hidden partition. The BIOS determines the identities of peripheral devices on the system and interrogates the hidden partition for BIOS extension files corresponding to each of the identified devices. If the hidden partition contains a BIOS extension file corresponding to an identified peripheral device, the file is verified for authenticity. If the verification completes successfully, at least a portion of the BIOS extension file is copied into shadow RAM and control is passed to it. In one embodiment, the DASD hidden partition is implemented according to the Protected Area Run Time Interface Extension Services (PARTIES) internal working document, or its successor document(s), of the American National Standards Institute (ANSI). In this embodiment, each BIOS extension file could be downloaded to the system's DASD using a standards-based update process thereby eliminating the need for vendor/adapter specific update processes (i.e., file copy vs. proprietary update programs). In addition, the ability to download BIOS extension files directly to system DASD decreases the cost of the adapter by making obsolete the need for an option ROM.

BRIEF DESCRIPTION OF THE DRAWINGS

Other objects and advantages of the invention will become apparent upon reading the following detailed description and upon reference to the accompanying drawings in which.

Figure 1:
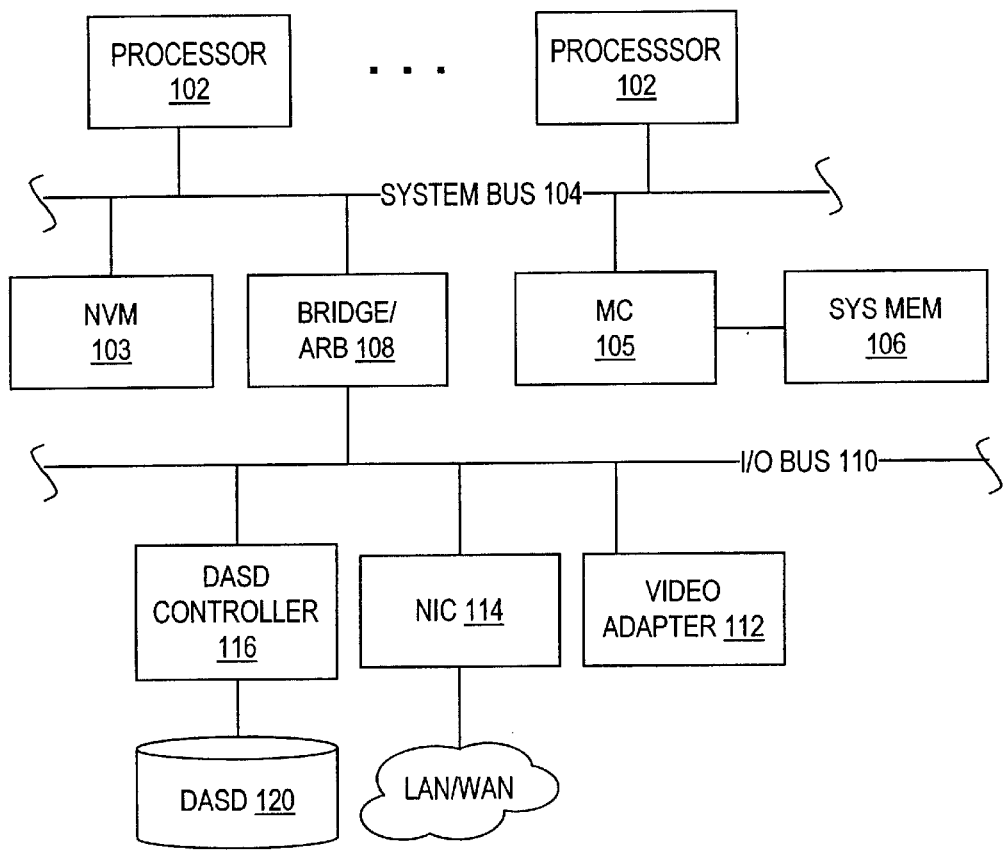
FIG. 1 is block diagram of selected portions of a data processing system suitable for implementing the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Turning now to FIG. 1 of the drawings, a block diagram of selected features of a data processing system 100 suitable for implementing the present invention is depicted. In the depicted embodiment, system 100 includes a set of two or more main processors 102A through 102N (generically or collectively referred to as processor(s) 102) that are each connected to a system bus 104. A read-only memory or other non-volatile memory (NVM) device 103 containing the system BIOS code is connected to system bus 104. NVM 103 is typically implemented as a flash memory card or other electrically erasable and programmable storage device. In addition, a system memory 106 is accessible to each processor 102 through an intervening memory controller 105 via system bus 104. Because each processor 102 has substantially equal access to system memory 106 such that the memory access time is substantially independent of the processor, the depicted embodiment of system 100 is an example of a symmetric multiprocessor (SMP) system. It will be appreciated however, that the present invention may be suitably implemented on systems with different architectures including, as examples, uni-processor systems and non-uniform memory access (NUMA) multi-processor systems.

In the depicted embodiment of system 100, a bus bridge 108 provides an interface between system bus 104 and an I/O bus 110 to which one or more peripheral devices are connected. I/O bus 110 is typically compliant with one of several industry standard I/O bus specifications including, as an example, the Peripheral Components Interface (PCI) bus as specified in *PCI Local Bus Specification Rev* 2.2 by the PCI Special Interest Group (www.pcisig.com). Bus bridge 108 and memory controller 105 may be implemented with a chip set specifically designed for use with processors 102 and system bus 104.

The peripheral devices connected to I/O bus 110 may include a video adapter 112, a high-speed network adapter (NIC) 114 through which system 100 is connected to a data processing network such as a local area network (that may itself be connected to a wide area network such as the Internet), and a DASD controller 116 to which a DASD 120 is connected. Each of the peripheral devices 116, 112, and 114, and any other adapters that may be connected to system 100, typically includes internally stored identification (ID) information that may be accessed via I/O bus 110 to identify the adapter.

In one embodiment, DASD controller 116 and DASD 120 are AT-attached (ATA) compliant devices also commonly referred to as IDE devices as specified in the ANSI National Committee for Information Technology Standardization (NCITS) 317-1998. ATA hard disks comprise the primary boot device in a vast majority of desktop and laptop class personal computers.

Portions of the present invention may be implemented as a set of computer executable instructions (software) stored on a computer readable medium such as system memory 106, a cache memory (not depicted) of a processor 102, NVM 103, a floppy diskette, hard disk, CD ROM, DVD, magnetic tape, or other suitable storage element.

Figure 2:
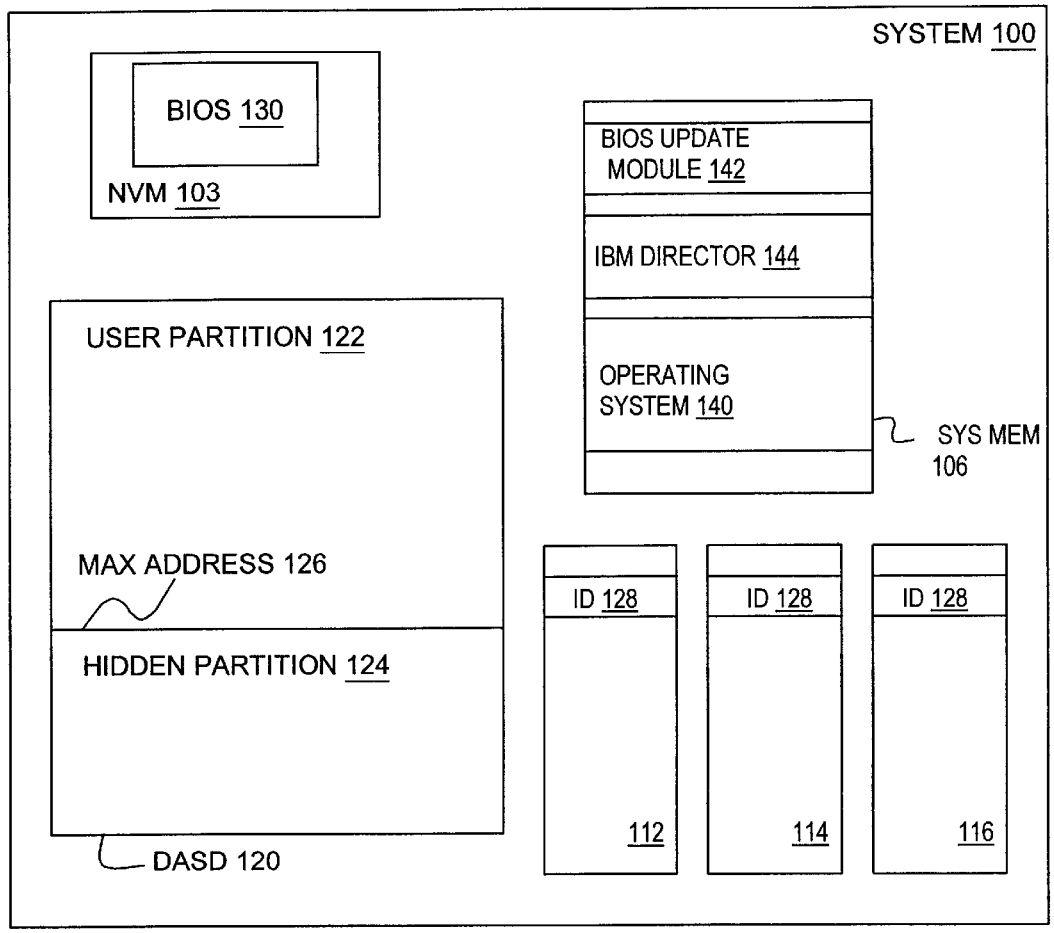
FIG. 2 is a conceptual representation of the organization of a direct access storage device according to one embodiment of the present invention.

Referring to FIG. 2, a conceptual depiction of selected software modules that may comprise a portion of system 100 are depicted. In the depicted embodiment, NVM 103 contains BIOS code 130 that is invoked or executed each time system 100 is powered on or it is hardware reset. BIOS code 130 is typically configured to establish a low-level abstraction layer to the hardware interface for the operating system, to execute the system's POST, and to copy at least a portion of the operating system from DASD 120 into system memory 106. In addition, BIOS code 130 is configured to identify each peripheral device connected to I/O bus 110 (shown in FIG. 1) by its corresponding device identification information represented in FIG. 2 by reference numeral 128.

Following the successful completion of the POST, BIOS 130 according to one embodiment the present invention is configured to determine if a BIOS extension file exists for each of the identified peripheral devices. If system BIOS 130 detects a BIOS extension file corresponding to an identified peripheral device, BIOS 130 validates the file and copies portions of valid extension files into a portion (referred to herein as shadow RAM) of system memory 106. In addition to BIOS runtime code, BIOS extension files typically include code that handles the hardware initialization of the corresponding adapter. The hardware initialization portions of a BIOS extension are typically not copied into shadow RAM. In one embodiment, BIOS 130 searches for BIOS extension files in a portion of DASD 120. DASD 120 may be logically partitioned into at least two partitions identified in FIG. 2 as user partition 122 and hidden partition 124. As their names imply, user partition 122 identifies a portion of DASD 120 that is available to application programs and the operating system while hidden partition 124 identifies a portion of DASD 120 that is generally inaccessible to the operating system and any applications running under it. Hidden partition 124 may be configured by invoking a SET MAX ADDRESS command that configures the highest logical block address of DASD 120 that the operating system may access. One method of using the SET MAX ADDRESS command to partition DASD 120 is more fully described in the PARTIES documentation referenced above.

BIOS 130 may be configured to determine the boundaries of user partition 122 (generally from logical block address 0 to MAX ADDRESS 126) and hidden partition 124 (generally from MAX ADDRESS 126 and above). One embodiment of the invention contemplates using hidden partition 124 in DASD 120 to store BIOS extension files for one or more of the peripheral devices connected to system 100. In this embodiment, BIOS 130 may, upon determining the boundary of hidden partition 124, "search" hidden partition 124 for a BIOS extension file corresponding to a particular adapter. To facilitate this search, one embodiment of the invention uses the adapter identification information 128 corresponding to each adapter to identify the corresponding BIOS extension file (if any). The filename of a BIOS extension file, for example, may correspond to the identification information 128 of the respective adapter. If there is no filename corresponding to a particular identification information 128, the respective peripheral device does not include have a BIOS extension.

The existence of a valid BIOS extension file in hidden partition 124 of DASD 120 does not necessarily preclude the presence of an Option ROM on the corresponding adapter. The invention handles cases where an adapter has an Option ROM as well as a valid BIOS extension file in DASD 120 by defining a default value, perhaps stored in the system's user-alterable CMOS settings, that prioritizes either the Option ROM code or the DASD BIOS extension code as the source of the BIOS extension code. In some cases, the system may prioritize the BIOS extension code source based on the relative ages of the Option ROM vs. the DASD code, selecting either the newer code or the older code depending upon the user preference. In addition, the system is preferably configured to check for the presence of an Option ROM on the adapter itself in cases where there is no BIOS extension file in DASD 120.

Figure 3:
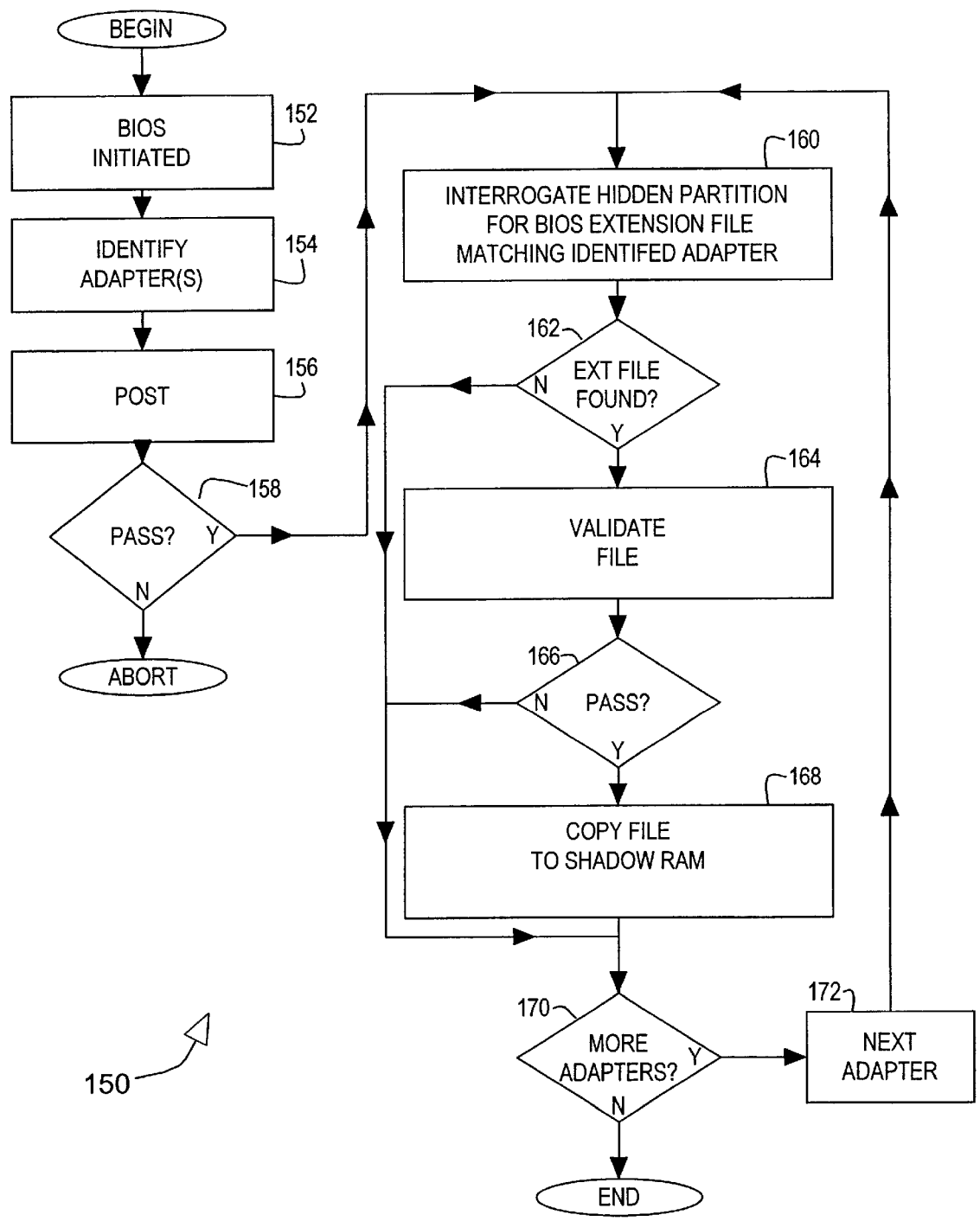
FIG. 3 is a flow diagram illustrating a method of using BIOS extension files in a data processing system.

Referring now to FIG. 3, a flow diagram illustrating a method 150 of booting or configuring a data processing system according to one embodiment of the present invention is presented. In the depicted embodiment, the system BIOS is initiated (block 152) typically in response to a power on event. As part of its execution, the system BIOS identifies (block 154) each of the peripheral device adapters connected to the system's I/O bus (or busses) and initiates (block 156) the POST. If the system fails the self test (block 158), the normal boot process is typically aborted. If the POST passes, the system enters a loop in which BIOS extension files, if present, are loaded into system memory.

The BIOS first interrogates (block 160) a portion of the system's DASD for BIOS extension files. In one embodiment, the DASD is logically partitioned as described in the PARTIES documentation such that the disk includes a hidden partition and a user partition. The system BIOS code may look for the BIOS extension files in the hidden partition in an embodiment where it is desirable to limit access to the BIOS extension files. The hidden partition is generally inaccessible to the operating system. For each identified adapter, the BIOS then determines (block 162) whether a corresponding BIOS extension file is found. If a BIOS extension file corresponding to a particular adapter is found, the file is validated (block 164). Validation may include verifying the file's checksum or crc and determining, for example, that the file begins with the hexadecimal code: 55 AA XX (as is required for all BIOS extensions) where XX is the number of 512 byte blocks of the file. If the validation passes (block 166), the BIOS extension file is copied (block 168) from hidden partition 124 of DASD 120 to a shadow RAM portion of system memory 106. The BIOS then determines (block 170) whether there more identified adapters remaining in the system. If there are, the next adapter in the set of identified adapters is selected (block 172) and the process of blocks 160 through 168 is repeated. Thus, method 150 determines for each adapter whether a corresponding BIOS extension file resides in the DASD hidden partition, validates the file if it exits, and copies the file into shadow RAM if it is valid.

The use of a standards-based architecture for storing and locating BIOS extension files enables a vendor independent and adapter independent method of updating BIOS extension files on a system. More particularly, with reference back to FIG. 1, system 100 may include a BIOS update software module 142 that is invoked from an application program such as a hardware management program 144 exemplified by the IBM Director software from IBM Corporation running under any of a variety of commercially distributed operating systems including the Windows® family of operating systems from Microsoft Corporation. BIOS update software module 142 is configured to enable a BIOS extension file to be downloaded and external source such as the web site of the adapter manufacturer. Since the hidden partition 124 of DASD 120 is inaccessible to user applications, module 142 may temporarily store any downloaded BIOS extension files in the user portion 122 of DASD 120. When the system is subsequently re-booted, system BIOS 130 may be configured to check user portion 122 for any newly downloaded BIOS extension files and, if any are found, to copy the file to hidden partition 124 using the standardized file naming convention discussed previously. In this manner, each BIOS extension files would conform to a common naming convention thereby eliminating the need for vendor specific update code.

It will be apparent to those skilled in the art having the benefit of this disclosure that the present invention contemplates a system and method for maintaining BIOS extension files in a hidden partition of the system's disk to provide a standardized BIOS extension update procedure that eliminates the need for expensive ROM's on the adapter cards and utilizes a secure portion of the disk space to ensure the code's reliability. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A method of configuring a data processing system following a power on or hardware reset event, comprising:
   identifying at least one peripheral device connected to the system;
   determining whether a hidden partition of a system DASD includes a BIOS extension file corresponding to the identified peripheral device wherein said determining includes determining the boundary of the hidden partition; and
   responsive to detecting a BIOS extension file corresponding to the identified peripheral device in the hidden partition, copying the file into a portion of a system memory of the data processing system.

2. The method of claim 1, wherein identifying at least one peripheral device comprises a portion of a BIOS sequence initiated in response to the power on or hardware reset event.

3. The method of claim 2, wherein determining whether the hidden partition includes the BIOS extension file and copying the file into system memory comprise a portion of the BIOS sequence.

4. The method of claim 1, wherein identifying at least one peripheral device comprises identifying a PCI adapter connected to a PCI bus of the data processing system.

5. The method of claim 1, wherein identifying at least one peripheral device includes determining an adapter ID associated with the peripheral device and wherein determining whether the hidden partition includes the BIOS extension file comprises determining whether a BIOS extension file corresponding to the adapter ID is present.

6. The method of claim 5, wherein determining whether a BIOS extension file corresponding to the adapter ID is present comprises determining whether the bidden partition includes a file having a filename corresponding to the adapter ID.

7. The method of claim 1, wherein determining the boundary of the hidden partition includes determining the MAX ADDRESS associated with the DASD.

8. The method of claim 7, wherein the DASD is partitioned in compliance with PARTIES documentation.

9. The method of claim 1, wherein determining whether the hidden partition includes a BIOS extension file and copying the file into system memory are repeated for each identified peripheral device.

10. The method of claim 1, further comprising determining that the identified adapter has an Option ROM and responsive thereto, copying either the Option ROM code or BIOS extension file in the hidden partition based on die state of a user-alterable system parameter.

11. A computer program product comprising a set of processor executable instructions for configuring a data processing system stored on a computer readable medium, the instructions comprising:
   computer code means, comprising a portion of a system BIOS, for identifying at least one peripheral device connected to the system;
   computer code means for determining whether a hidden partition of a system DASD includes a BIOS extension file corresponding to the identified peripheral device; and computer code means responsive to detecting a BIOS extension file corresponding to the identified peripheral device in the hidden partition for copying the file into a portion of a system memory of the data processing system.

12. The computer program product of claim 11, wherein the code means for determining whether the hidden partition includes the BIOS extension file and copying the file into system memory comprise a portion of the system BIOS.

13. The computer program product of claim 11, wherein the code means for identifying at least one peripheral device comprises code means for identifying a PCI adapter connected to a PCI bus of the data processing system.

14. The computer program product of claim 11, wherein the code means for identifying at least one peripheral device includes code means for determining an adapter ID associated with the peripheral device and wherein the code means for determining whether the hidden partition includes the BIOS extension file comprises code means for determining whether a BIOS extension file corresponding to the adapter ID is present.

15. The computer program product of claim 14, wherein the code means for determining whether a BIOS extension file corresponding to the adapter ID is present comprises code means for determining whether the hidden partition includes a file having a filename corresponding to the adapter ID.

16. The computer program product of claim 11, wherein the code means for determining whether a hidden partition includes the BIOS extension file includes codes means for determining the boundary of the hidden partition.

17. The computer program product of claim 16, wherein the code means for determining the boundary of the hidden partition includes code means for determining the MAX ADDRESS associated with the DASD.

18. The computer program product of claim 17, wherein the DASD is partitioned in compliance with PARTIES documentation.

19. The computer program product of claim 11, wherein the code means for determining whether the hidden partition includes a BIOS extension file and the code means for copying the file into system memory are repeated far each identified peripheral device.

20. The computer program product of claim 11, further comprising determining that the identified adapter has an Option ROM and responsive thereto, copying either the Option ROM code or BIOS extension file in the hidden partition based on the state of a user-alterable system parameter.

21. A data processing system including at least one processor, a system memory connected to the processor, a non-volatile storage device connected to the processor containing BIOS code, and a DASD connected to an I/O bus of the system, the BIOS containing code for configuring the data processing system, the code comprising:

computer code means for identifying at least one peripheral device connected to the system including code means for determining an adapter ID associated with the peripheral device;

computer code means for determining whether a hidden partition of a system DASD includes a BIOS extension file corresponding to the identified peripheral device including code means for determining whether a BIOS extension file corresponding to the adapter ID is present; and computer code means responsive to detecting a BIOS extension file corresponding to the identified peripheral device in the hidden partition for copying the file into a portion of a system memory of the data processing system.

22. The data processing system of claim 21, wherein the code means for identifying at least one peripheral device comprises a portion of a system BIOS.

23. The data processing system of claim 22, wherein the code means for determining whether the hidden partition includes the BIOS extension file and copying the file into system memory comprise a portion of the system BIOS.

24. The data processing system of claim 21, wherein the code means for identifying at least one peripheral device comprises code means for identifying a PCI adapter connected to a PCI bus of the data processing system.

25. The data processing system of claim 21, wherein the code means for determining whether a BIOS extension file corresponding to the adapter ID is present comprises code means for determining whether the hidden partition includes a file having a filename corresponding to the adapter ID.

26. The data processing system of claim 21, wherein the code means for determining whether a hidden partition includes the BIOS extension file includes codes means for determining the boundary of the hidden partition.

27. The data processing system of claim 26, wherein the code means for determining the boundary of the hidden partition includes code means for determining the MAX ADDRESS associated with the DASD.

28. The data processing system of claim 27, wherein the DASD is partitioned in compliance with PARTIES documentation.

29. The data processing system of claim 21, wherein the code means for determining whether the hidden partition includes a BIOS extension file and the code means for copying the file into system memory are repeated for each identified peripheral device.

30. The data processing system of claim 21, further comprising determining that the identified adapter has an Option ROM and responsive thereto, copying either the Option ROM code or BIOS extension file in the hidden partition based on the state of a user-alterable system parameter.

* * * * *